ized Patent [19]

United States Patent [19]
Schell

[11] 4,168,299
[45] * Sep. 18, 1979

[54] CATALYTIC METHOD FOR HYDROLYZING UREA

[75] Inventor: Lorenz P. Schell, Sulphur, La.

[73] Assignee: Olin Corporation, New Haven, Conn.

[*] Notice: The portion of the term of this patent subsequent to May 2, 1995, has been disclaimed.

[21] Appl. No.: 888,440

[22] Filed: Mar. 20, 1978

[51] Int. Cl.$^2$ .................... C07C 126/08; C01C 1/08
[52] U.S. Cl. ................... 423/358; 260/555 A; 423/232; 423/237; 423/437; 210/71
[58] Field of Search ............. 423/437, 232, 237, 356, 423/358, 359; 260/555 A, 555 B, 555 C, 555 R; 210/71, 65

[56] References Cited

U.S. PATENT DOCUMENTS

| | | | |
|---|---|---|---|
| 3,826,815 | 7/1974 | Maurovic | 260/555 A |
| 3,851,041 | 11/1974 | Eickmeyer | 423/232 |
| 3,896,212 | 7/1975 | Eickmeyer | 423/232 |
| 3,922,222 | 11/1975 | Van Moorsel | 260/555 A |
| 4,087,513 | 5/1978 | Schell | 423/437 |

*Primary Examiner*—O. R. Vertiz
*Assistant Examiner*—Thomas W. Roy
*Attorney, Agent, or Firm*—William A. Simons; T. P. O'Day

[57] ABSTRACT

A method for hydrolyzing urea in aqueous solutions such as waste-water streams which comprises heating the aqueous solution containing urea in the presence of a catalytic amount of vanadium pentoxide for sufficient time and at sufficient temperatures to effect hydrolysis of substantially all of the urea to ammonia and carbon dioxide.

11 Claims, No Drawings

CATALYTIC METHOD FOR HYDROLYZING UREA

BACKGROUND OF THE INVENTION

1. Field of the Invention

This invention relates to a method of hydrolyzing urea contained in aqueous solutions, such as waste-water streams. In particular, the present invention relates to a novel catalytic process for hydrolyzing urea.

2. Description of the Prior Art

Urea is commonly made today by reacting ammonia and carbon dioxide under elevated pressures and temperatures. This reaction also forms water as a by-product. After the reaction is over, the urea is usually separated from the reaction mixture by conventional concentration or crystallization methods. Thus, a urea product, normally in solid form, is recovered. The by-product water is also collected in various waste-water streams. Such streams still may contain a minor amount of urea, urea-related compounds and/or unreacted ammonia and carbon dioxide. Therefore, in nearly all commercial urea processes, these streams, before discharged as effluents, are passed through an ammonia desorber or stripper which recovers unreacted ammonia from the waste-water streams for re-use in the urea process or other chemical processes. However, when these waste-water streams are passed through the ammonia desorber, very little urea contained therein is affected by the stripping operation and, thus, substantially all of the urea in the waste-water streams is disposed of in the effluent streams.

It is now recognized by both the urea industry and the responsible governmental agencies that having urea-containing effluent streams may create possible environmental hazards. Therefore, several processes have been suggested for treating these urea-containing streams. For example, it is known that one of the most effective ways of removing urea from a water stream is simply to hydrolyze it back to ammonia and carbon dioxide at above ambient temperatures (the reverse reaction of the above-described urea synthesis). Some hydrolysis treatments have been disclosed. See U.S. Pat. Nos. 3,826,815, issued to Mavrovic on July 30, 1974 and 3,922,222, issued to Van Moorsel on Nov. 25, 1975. However, these hydrolysis treatments of urea have certain disadvantages. Most importantly, they require the construction of additional equipment for the hydrolysis. Also, this additional equipment must be constructed of expensive stainless steel because urea solutions may cause corrosion of ordinary carbon steel equipment. Still further, hydrolysis processes such as those illustrated in the cited patents require substantial energy costs because large amounts of steam are normally required to heat the urea hydrolysis reaction.

As described in U.S. Pat. application Ser. No. 823,883, now U.S. Pat. No. 4,087,513, filed on Aug. 12, 1977, the present inventor has found that it would be quite advantageous to utilize the $CO_2$ recovery streams of adjacent ammonia production plants to hydrolyze the urea contained in waste-water streams formed in the production of urea. Specifically, that invention was found to be superior to the known urea hydrolysis processes because no new equipment was necessary and it was also possible to lower the energy requirements of the ammonia process.

BRIEF SUMMARY OF THE INVENTION

The present invention is directed to a process for hydrolyzing urea in aqueous solutions such as waste-water streams which comprises heating the aqueous solution containing urea in the presence of a catalytic amount of vanadium pentoxide for sufficient time and at sufficient temperatures to effect hydrolysis of substantially all of the urea to ammonia and carbon dioxide.

DETAILED DESCRIPTION

Any aqueous solution containing a minor percentage of urea (i.e., less than about 50% by weight of the total stream) can be treated by the process of the present invention. Any waste-water streams from any conventional urea production processes are most likely to be treated by the present invention. Yet, other sources including water streams from urea storage and loading facilities (i.e., to collect spillage and leaks may also be advantageously treated according to the process of the present invention.

The term "urea" as employed in the present specification and claims includes urea-like chemical compounds such as biuret and the like which, when hydrolyzed, forms carbon dioxide and ammonia. Preferably, the percentage of urea in the waste-water stream is from about 0.01% to about 20% by weight of the stream. More preferably, the present process is advantageously used to treat waste-water streams containing from about 0.05% to about 10% by weight of urea.

For illustration, the following briefly describes a urea production process that produces a waste-water stream which may be advantageously treated according to the process of the present invention. First, ammonia and carbon dioxide are reacted together, for example at about 175°–200° C. and about 2500–3000 psig, to form ammonium carbamate

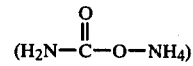

which by an equilibrium reaction forms urea and water. These reactions are represented by the following equations:

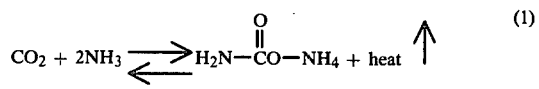

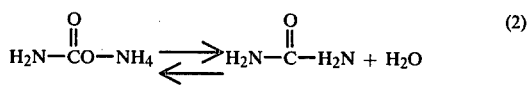

Following substantial completion of these reactions, the gaseous reaction mixture is passed through a multi-stage gas separator to remove large amounts of unreacted ammonia and carbon dioxide gases and lower the pressure of the reaction mixture to about atmospheric pressure. Then, the reaction mixture is passed through a flash tank which is under vacuum. This step effects the removal of large quantities of water vapor. After passing through the flash tank, the resulting reaction mixture, which now usually contains about 70-75% by weight urea and about 30-25% water, is sent through a two-stage evaporator wherein the remaining water is evaporated off and substantially anhydrous urea product (i.e., above 99% by weight urea) is formed. The substantially anhydrous urea product is then prilled into a solid urea product suitable for sale or use in other chemical processes. The vaporized water from the flash tank and from the evaporator is combined and then condensed to form a waste-water stream. This waste-water stream is preferably passed through an ammonia desorber which removes a large portion of the ammonia without affecting the small amount of urea contained therein. This waste-water stream may be then treated according to the process of the present invention. However, it should be recognized that the present invention is not limited to any particular process by which the waste-water stream is formed. As stated above, the process of the present invention emcompasses the concept of hydrolyzing the urea contained in such waste-water streams in the presence of a catalytic amount of $V_2O_5$ or chemical equivalents thereof for sufficient time and at sufficient temperatures to hydrolyze substantially all (i.e., more than about 90% by weight) of the urea contained therein. This hydrolysis reaction can be represented by the following equation:

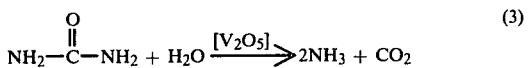 (3)

A proper catalytic amount of $V_2O_5$ for this reaction will be different for each application because of the variance of many reaction parameters and other factors. Included among such parameters and factors are the general method and/or apparatus employed for such hydrolysis; the presence or absence of other impurities in the waste-water streams besides urea; the desired rate of hydrolysis and the like. However, for most purposes, the catalytic amount of $V_2O_5$ employed will be in the range of from about 0.02% to about 1.0% by weight (expressed as vanadium) of the aqueous solution being treated. Preferably the amount of $V_2O_5$ will be from about 0.05% to about 0.5% by weight (expressed as vanadium) of the aqueous solution. Other oxides of vanadium and ions thereof may be considered to be effective for the present invention; however, their effectiveness has not been positively demonstrated at the time of filing this application.

The urea-containing aqueous solutions must be treated at a sufficiently high temperature so that substantially all of the urea will be hydrolyzed. Such temperature will vary for each application and will depend on many factors including the desired rate of reaction. Generally, for most applications it is desirable to carry out the urea hydrolysis at a temperature in the range of about 70° C. to about 200° C., more preferably, from about 80° C. to about 180° C., and most preferably, from about 90° C. to about 160° C.

Like the reaction temperature, the reaction time is an important consideration for determining the extent of the urea hydrolysis. However, the optimum time will also vary for each installation and is also dependent on many factors including reaction temperature. Generally, a reaction time of at least about 10 minutes, preferably about 15 to about 60 minutes, is desirable for most applications. The present catalytic method for hydrolyzing urea may be carried out in any suitable apparatus. When treating urea-containing waste-water streams from urea production processes, it is particularly advantageous to use the $V_2O_5$ in the normally existing ammonia desorber of most urea production plants or in the $CO_2$ recovery systems of adjacent ammonia production processes. The additional high cost of constructing new equipment is prevented by utilizing such existing facilities.

After the urea has been hydrolyzed to carbon dioxide and ammonia by the present catalytic process, it is generally advisable to remove the just-formed ammonia from the aqueous solution. Environmental standards normally prohibit the discharge of $NH_3$ (the same as urea) in effluent waste-water streams. The formed carbon dioxide does not normally represent any significant environmental hazards.

If the catalyzed hydrolysis occurs in the conventional ammonia desorber, then the $NH_3$ formed from urea will be easily removed with the rest of $NH_3$ present in the waste-water streams. Thus, additional ammonia may be recovered from the hydrolyzed urea and recycled back to the urea production processes or other chemical processes from the top of the desorber.

Still further, since some aqueous solutions utilized in $CO_2$ recovery systems in ammonia production processes may contain $V_2O_5$ (see U.S. Pat. Nos. 3,851,041 and 3,896,212, issued to Eickmeyer on Nov. 26, 1974 and July 22, 1975, respectively), it may in some situations be desirable to instead hydrolyze the urea in these waste-water streams with such $V_2O_5$-containing aqueous solutions. This concept is more fully described in co-pending U.S. patent application Ser. No. 823,883, now U.S. Pat. No. 4,087,513, filed by the present inventor which is incorporated herein by reference in its entirety. Alternatively, when such ammonia and urea production plants are adjacent to each other, it may be desirable to circulate a small portion of said $V_2O_5$-containing aqueous solution utilized in the $CO_2$ recovery system to the ammonia desorber feed tank or directly to the ammonia desorber itself. In particular, this portion of the catalyst-containing aqueous solution may be fed from the $CO_2$ recovery system to the top of the ammonia desorber and travel downward therein while contacting the urea-containing aqueous stream in the desorber. Thus, at least a portion of the urea in the waste-water stream will be hydrolyzed in the desorber. Upon reaching the bottom of the desorber, the resulting mixture of the two aqueous solutions will be recycled back to the $CO_2$ recovery system rather than be immediately discharged as effluent. In the $CO_2$ recovery system, this mixture of aqueous solutions can be re-used as an energy-saving reflux and for the completion of the hydrolysis of the urea contained in the aqueous mixture as indicated in U.S. patent application Ser. No. 823,883, now U.S. Pat. No. 4,087,513.

The following example and comparison further illustrate the process of the present invention. All portions and percentages are by weight unless explicitly stated otherwise.

EXAMPLE

Two aqueous solutions, each containing 10 grams/liter of urea to which vanadium pentoxide added to each up to a concentration of 0.1% by weight vanadium, were heated in laboratory flasks and held at reflux for 30 minutes at 215° F. The percentage of the urea that was hydrolyzed was measured and the results of each of these two runs are shown below in Table I.

COMPARISON

Two aqueous solutions, each containing 10 grams/liter of urea without any vanadium pentoxide, were heated in laboratory flasks and held at reflux for 30 minutes at 215° F. The percentage of the urea that was hydrolyzed in each solution was measured and the results of each of these two runs are shown below in Table I.

TABLE I

| Catalyst | % Urea Hydrolyzed | |
|---|---|---|
| | First Run | Second Run |
| $V_2O_5$ | 26.8 | 31.1 |
| None | 4.6 | 4.1 |

These results show that the hydrolysis reaction proceeds significantly faster at a given temperature when $V_2O_5$ is also present as a catalyst. Thus, a shorter residence time for hydrolysis generally may be utilized. Furthermore, lower hydrolysis temperatures and/or pressures may be used and, thus, equipment costs may be lowered.

What is claimed is:

1. In the process of hydrolyzing urea to carbon dioxide and ammonia, the improvement which comprises
   carrying out said urea hydrolysis in the presence of a catalytic amount of $V_2O_5$.

2. A process for hydrolyzing urea contained in an aqueous solution which comprises
   heating said aqueous solution in the presence of a catalytic amount of $V_2O_5$ for sufficient time and at sufficient temperatures to effect hydrolysis of at least a portion of said urea to ammonia and carbon dioxide.

3. The process of claim 2 wherein said ammonia is then separated from said aqueous solution.

4. The process of claim 2 wherein the amount of said urea in said aqueous solution is from about 0.01% to 20% by weight of said aqueous solution.

5. The process of claim 4 wherein said hydrolysis temperature is in the range from about 70° C. to about 200° C.

6. The process of claim 5 wherein said aqueous solution is the waste-water stream from a urea production process.

7. The process of claim 6 wherein said hydrolysis occurs within an ammonia desorber in a urea production process.

8. The process of claim 6 wherein said urea hydrolysis occurs in a carbon dioxide recovery system in an ammonia production process.

9. The process of claim 8 wherein said catalytic amount of $V_2O_5$ is in the range of about 0.02% to about 1.0% by weight (expressed as vanadium) of said waste-water solution.

10. The process of claim 9 wherein the hydrolysis temperature is from about 90° C. to about 160° C. and the catalytic amount of $V_2O_5$ is from about 0.05% to 0.5% by weight (expressed as vanadium) of said waste-water stream and the amount of urea in said waste-water stream is from about 0.5% to about 10% by weight of said stream.

11. The process of claim 2 wherein substantially all of said urea is hydrolyzed.

* * * * *